United States Patent [19]

Monney et al.

[11] 3,748,386

[45] July 24, 1973

[54] TIME-BASE ERROR CORRECTION SYSTEM

[75] Inventors: Daniel L. Monney, Mountain View; William F. Herzog, Campbell, both of Calif.

[73] Assignee: Ampex Corporation, Redwood City, Calif.

[22] Filed: Apr. 3, 1972

[21] Appl. No.: 240,729

[52] U.S. Cl. .................... 178/69.5 DC, 178/6.6 TC

[51] Int. Cl. .............................................. H04n 5/04

[58] Field of Search ............... 178/69.5 R, 69.5 TV, 178/69.5 DC, 5.4 SY; 179/15 BS

[56] References Cited

UNITED STATES PATENTS

| | | | |
|---|---|---|---|
| 2,748,188 | 5/1956 | Stahl et al. | 178/5.4 SY |
| 3,384,707 | 5/1968 | Bopp et al. | 178/69.5 DC |
| 3,419,681 | 12/1968 | Bopp et al. | 178/69.5 TV |
| 3,454,719 | 7/1969 | Horstmann et al. | 178/69.5 TV |
| 3,505,473 | 4/1970 | Dillenburger et al. | 178/69.5 TV |

*Primary Examiner*—Robert L. Griffin
*Assistant Examiner*—Richard D. Maxwell
*Attorney*—Robert G. Clay et al.

[57] ABSTRACT

A time-base error correction system for a video signal employing a plurality of serially connected delay lines. Circuit means are conditioned to detect the closest timing match between a reference synchronizing signal and the video signal as it appears at various points along the delay path and to connect the appropriate delay line point or junction to an output at which the correctly delayed video signal appears. Featured circuitry provides for eliminating the erroneous leading edge of a video synchronizing pulse distorted by changes in the selected delay point and for compensating for variations in d.c. offset of the video signal introduced by differential delay line path effects.

5 Claims, 4 Drawing Figures

TIME-BASE ERROR CORRECTION SYSTEM

The present invention generally relates to variable delay circuitry and more particularly to a system for correcting time-base errors in a periodic or repetitive signal such as a video signal.

In many electrical systems it is desirable or necessary to change the time base of a signal such that it coincides with that of a reference waveform. For example, in the art of magnetic tape recording of video signals, it is necessary to correct timing errors during playback such that reproduced video is synchronized with a standard reference signal. In order to provide this processing of the reproduced video waveform, a number of time-base error correction systems have been developed, all of which include some form of variable delay circuitry with the amount of instantaneous delay being responsive to a measured time-base error. One type of correction system makes use of a plurality of fixed delay lines functioning in combination with the switching circuitry such that the video signal may be fed through different delay paths in accordance with the condition of the switching circuitry. Another scheme requires the use of a voltage variable delay line employing lumped constant inductors and voltage variable capacitors connected as a delay line network. Examples of these systems are found in U.S. Pat. No. 3,384,707 and U.S. Pat. No. 3,202,769.

The present invention employing both types of time-base error correction schemes, is primarily directed to an improvement of the switched delay line class of devices. In particular it is an object of the present invention to provide more efficient delay network for use in a video time-base error correction system where efficiency is measured in terms of cost versus delay correction capacity or range. In other words, the system of the present invention has the objective of providing a variable delay range useful for most video recording systems at a lower cost than for other time-base error correctors having an equivalent capacity, reliability and accuracy.

It is a further object of the present invention to provide an improved clamping arrangement for a time-base error correction system of the type disclosed herein, for eliminating line-to-line d.c. offset errors caused by passing the video signal through different delay paths.

It is still a further object of the invention to provide an improved fast acting, and more reliable d.c. clamping circuit capable of correcting d.c. offset errors in a video signal on a line-by-line basis. Line-by-line refers to successive horizontal lines of video.

These and other objects are achieved in accordance with the present invention by a variable delay system employing a plurality of serially connected fixed delay lines as known per se in combination with a signal detection and switching circuit arrangement operating to compare the video synchronizing waveform (video sync) as it appears at the input, output, and interconnecting junctions of the delay lines with a standard or reference synchronizing signal and to select the delay point at which video sync first occurs following reference sync for connection to a video signal output.

Further, in accordance with the present invention a stretched sync inhibit circuit is provided for cancelling the erroneous leading edge of a video signal synchronizing waveform which has been unavoidably stretched by a switched increase in the amount of signal delay through which the video is passed. This feature of the invention eliminates among other things the requirement of a delay circuit upstream of the switched serially connected delay lines which has been found necessary in other systems. Delay lines or delay circuits in advance of the switched variable delay path are undesirable because of the increased cost and complexity.

Further in accordance with the present invention, circuitry is provided for arbitrarily selecting one of the delay points in the serial path for connection to the video output in the event the video signal is outside the delay range capacity of the system. This avoids the consequence of none of the delay points being selected pursuant to comparison between the video synchronizing waveform and the reference signal.

A still further aspect of the present invention is the provision of a slow acting d.c. clamping or restoration circuit at the input to the delay line networks accompanied by a novel fast acting line-by-line d.c. clamping circuit operating on the video signal following the delay line network. This combination of a slow acting or "soft" clamp at the input and a line-by-line or "hard" clamp adjacent the circuit output functions to efficaciously eliminate variations between the d.c. levels of each video period, in this instance a video line caused by switching from one delay path to another. The effectiveness of the d.c. offset compensation provided by the circuitry of the present invention is believed to contribute greatly to the practicality and economy of the present system as discussed more fully herein.

A full disclosure of the present invention and the presently preferred embodiment thereof is provided below in conjunction with the drawings in which.

Figure 3:
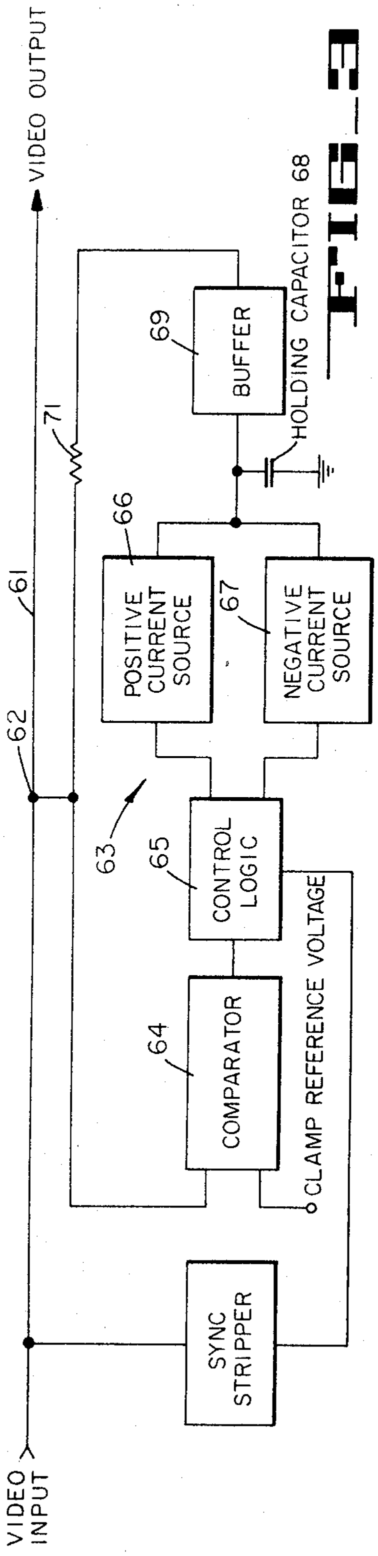
FIG. 3 is a block diagram illustrating a clamping circuit constructed in accordance with the present invention and employed in the system of FIG. 2.
Figure 4:
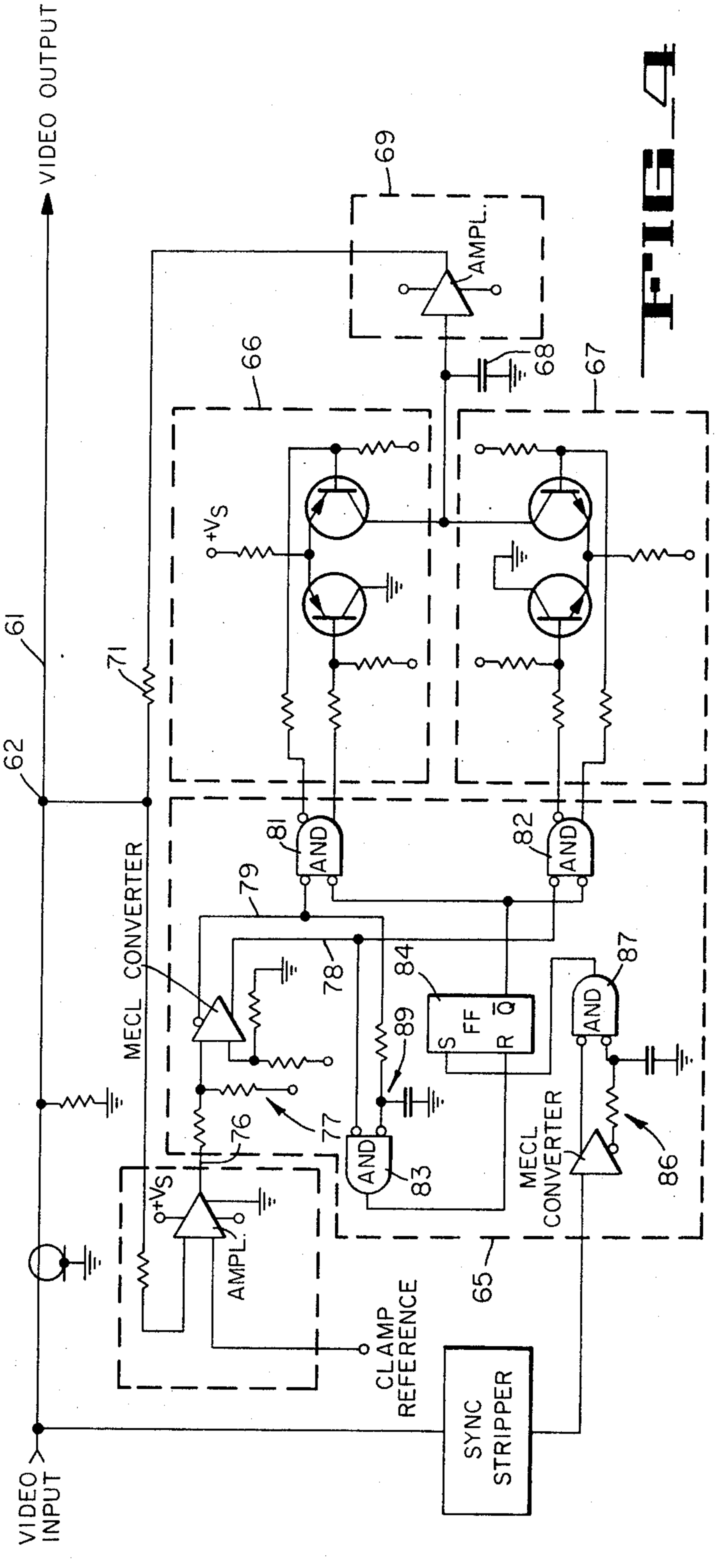

and FIG. 4 is a detailed schematic diagram of the clamping circuit of FIG. 3.

Figures 1, 2:
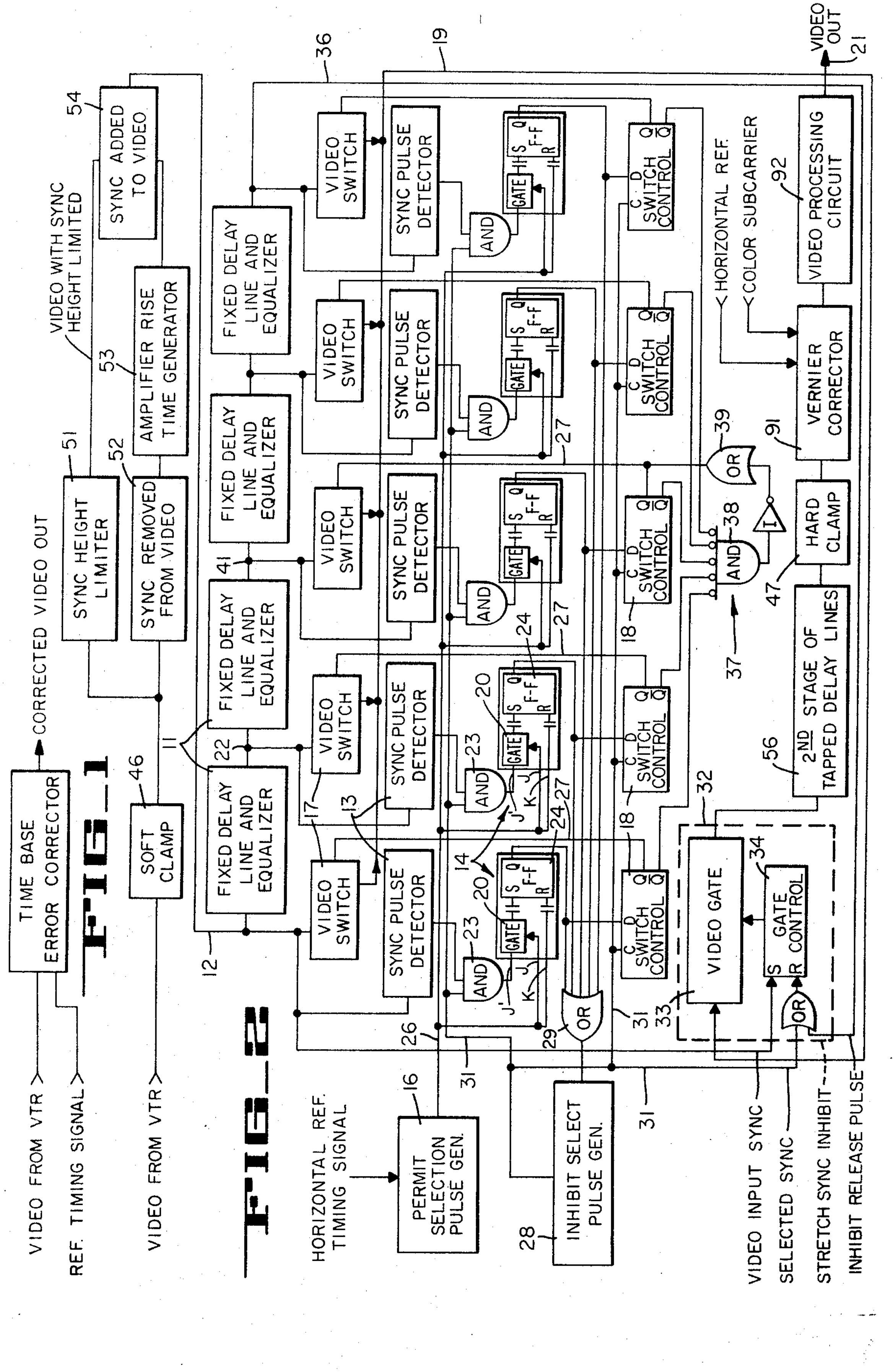
FIG. 1 is a block diagram illustrating generally a time-base error correction system.
FIG. 2 is a comprehensive block diagram of the time-base error correction system constructed in accordance with the present invention.

The environment in which the present invention functions is illustrated generally by FIG. 1, in which a time-base error corrector is adapted to receive a video signal from a video tape recorder (VTR) and to detect any timing errors in this signal relative to a reference timing waveform. The video is selectively delayed in response to measured time-base error and issued as a corrected signal at the output. FIG. 2 illustrates a time-base error correction system constructed in accordance with the present invention in which a plurality of fixed delay lines and equalizer 11 are connected in a serial signal path with an input line 12 thereto adapted to receive a video signal from the VTR. As the video signal passes through this series of lines it is differentially delayed at the various taps or junctions associated with the lines and one of these taps is selected by detection circuitry for connection to an output. The detection circuitry, including a set of sync pulse detectors 13, sequence detection circuits 14, and a permit selection pulse generator 16, serves to sense the line tap at which a leading edge of the video synchronizing waveform, in this instance of a horizontal line, first occurs in time following the corresponding leading edge of a horizontal reference timing waveform. In response to this detection, switching circuitry in the form of video switches 17 and switch control circuits 18, connect the selected delay line tap to an output line 19 for passage to a connected video output 21.

As an example of this operation, assume that the video synchronizing waveform is just leaving the first delay lines 11 and at this time a leading edge of horizontal reference is applied to permit selection pulse generator 16. Generator 16 in turn issues a signal to one of the inputs of each of sequence detection circuits 14 as more fully described herein enabling these circuits to respond to their remaining input from their associated sync pulse detector 13 via AND gates 23. Shortly thereafter a tap 22 between the first and second delay lines receives the leading edge of the video sync and causes the associated sync pulse detector 13 to apply switching signal to the associated circuit 14 which in turn operates switch control 18 and the associated video switch 17. The video signal connected from tap 22 to line 19 passes through a series of output correction and processing stages to video output 21.

An important aspect of the present invention is that the detection circuitry does not merely sense coincidence of reference and video sync. It is unlikely that precise coincidence will occur each time between the leading edge of the reference waveform and leading edge of the video synchronizing signal at one of the delay line taps. Thus the present invention functions to detect the first leading edge of video sync to occur after the corresponding leading edge of the horizontal reference timing signal. Nor does the invention operate in response to mere concurrence or coincidence of both video sync and reference sync tips (these signals having finite widths are referred to as sync tips), as this would not satisfy the "after" requirement, namely, first video leading edge "after" reference leading edge. In order to provide this "first" and "after" function, each of sequence detection circuits 14 include a gate 20 which is a.c. coupled to an R-S flip-flop 24.

During operation, permit selection pulse generator 16 issues a signal over line 26 in response to the leading edge of the horizontal reference waveform enabling gate 20, via a J input of circuit 14, to respond to the sync pulse detector 13 associated with tap 22 through AND gate 23. When the leading edge of video sync appears at tap 22, AND gate 23 responds by issuing an output signal to the J′ input of circuit 14. Previously to this gate 20 has been conditioned by the permit selection pulse generator to enable the J′ input to respond to the output of AND gate 23 and thereby dispose flip-flop 24 in its set condition. This output of gate 20 is a.c. coupled to the set input (S) of flip-flop 24 while the K input of circuit 14 is a.c. coupled to the reset (R) input such that these inputs are responsive to certain polarities of signal transitions. These conditions enable flip-flop 24 to be disposed in its set condition only if line 26 has been first activated by a permit selection pulse and thereafter an output is received from AND gate 23.

In its set condition, the Q output of flip-flop 24 is high and in this state it activates the associated switch control 18 via a data input, d, to assume its set condition and the Q output of the control 18 thereby closes video switch 17 over a line 27. Flip-flops 24 are returned to their reset condition by the trailing edge of the permit selection pulse on line 26. The K input to each of circuits 14 is a.c. coupled to flip-flop 24 and is responsive only to a particular polarity of logic transition, in this instance the polarity transition associated with the trailing edge of the selection pulse on line 26. The foregoing logic restricts the functioning of sequence detection circuits 14 to select only that delay line tap at which the first video sync following reference sync occurs.

Once this selection of a tap is performed, the Q output of one of flip-flops 24 will, in addition to operating the associated switch control 18, activate an inhibit select pulse generator 28 through an OR gate 29. Each of the inputs to gate 29 is connected to the Q output of a separate one of flip-flops 24 as shown. Pulse generator 28 issues, over line 31, a signal to one of the inputs of each of AND gates 23 disabling such gates from responding to subsequent sync pulse detector signals. Thus, a selection once made disables the further operation of the remaining switch controls 18.

Furthermore, inhibit pulse generator 28 has its output line 31 connected to the clock inputs, *c*, of each of switch controls 18 so as to dispose such controls in a condition dictated by the instantaneous logic level at the data input, *d*. In this instance the data input is activated by the Q output of an associated flip-flop 24. Accordingly, a switch control 18 which has been disposed in its set condition during the previous measurement of a video line interval is reset by the occurrence of an inhibit pulse on line 31, as the data input *d*, at that time is in its low condition, (assuming that the same delay tap has not been selected). Conversely, the selected switch control 18 receives a high logic signal at the *d* input which is immediately followed by a signal at the *c* input from generator 28 causing the control to assume its set switching condition. The associated video switch 17 operates in response thereto.

It will be observed that the operating conditions of the disclosed network introduce a time shift distortion or error into the leading edge of the video synchronizing waveform as it appears on output line 19. In particular, if the detection circuitry operates to select a tap including a greater delay than the previously selected tap, the leading edge of the video sync waveform will coincide with that of the video signal as it appears at the upstream tap. In other words, the video sync waveform is improperly stretched. The present invention as an important feature of its construction and operation provides a stretch sync inhibit circuit 32 which serves to cancel this erroneous leading edge of the output sync waveform.

In particular, this is achieved by passing the video on output line 19 through a video gate 33 of inhibit circuit 32 and operating gate 33 in accordance with the sequence of signals appearing at input line 12 to the delay line path, and output line 31 from inhibit circuit pulse generator 28. A gate control circuit 34 has a set input responsive to the leading edge of video sync on input line 12 disposing the control circuit in its set condition which in turn operates gate 33 to "gate-off" the video signal. Gate control 34 remains in its set condition until it receives a signal over line 31 indicating that a delay line tap has been selected, this being generally coincidental with the occurrence of the leading edge of video at the selected tap. In response thereto gate 34 receives a reset signal through an OR gate associated with the reset input causing the gate control to assume its reset condition and gating the video "on" again. This function of control 34 and gate 33 effectively cancels that portion of the video synchronizing waveform erroneously introduced by switching from one tap of delay lines 11 to another down stream. To avoid the undesirable and possible consequence of gate control 34 failing to receive a reset signal from inhibit pulse generator 28, the reset input of control circuit 34 is alternatively responsive, through the OR gate to the video synchronizing waveform of the output tap of the last serial fixed delay line over line 36. This back-up signal serves as an inhibit release pulse to restore the video gate to its "on" condition allowing video to pass to output 21.

A still further aspect of the present invention is the provision of circuitry for arbitrarily selecting one of the delay taps for connection to output line 19 in the event the video signal waveform is out of the delay connection range of the detection and switching circuitry. Complete loss of video at output 21 is thereby avoided; it being preferable that some signal appears at the output even though it is incorrectly timed. For this purpose, an AND logic circuit 37 is provided including an AND gate 38 having inputs responsive to each of the Q outputs of separate switch controls 18. In the event all of switch controls 18 are disposed in their "off" condition, AND gate 38 issues an output signal. Assuming this happens, the output from gate 38 is inverted and applied through an OR gate 39 to the output line 27 from one of switch controls 18 thereby operating the associated video switch irrespective of the state of the switch control itself. In this instance, AND logic circuit 37 is connected to the video switch associated with a central tap 41, located halfway between the input and output of the delay line series.

Another important feature of the present invention lies in the use of a soft clamp 46, i.e., a clamp circuit having a slow time response, adjacent the input of the tapped delay lines sections, together with a hard clamp 47, i.e., fast-acting clamp circuit, adjacent the video output. The use of soft clamps and hard clamps, individually, in connection with video signal systems, is, of course, known per se. However, it has been found that the successful operation of the present invention, involving as it does the passage of the video signal through diverse delay line paths and through various switching devices, is due in part to the provision of both soft clamping at a point in the video path prior to the tapped delay lines and hard or fast-acting d.c. restoration at the video output. Soft clamp 46 is of a conventional design, well known to those skilled in the art, and provides for slowly eliminating over a plurality of horizontal line periods any d.c. offset errors in the video signal. That is, as intended for the present invention, a slow clamp refers to one having a time constant greater than the one horizontal line period and typically requiring from 5 to 20 video lines before stabilizing at an average d.c. correction. This provides for eliminating average d.c. offset errors so that any d.c. errors which are introduced in the signal by reason of passage through the delay lines and video switches lies within the correction range of hard clamp 47. After d.c. restoration by soft clamp 46, the video is fed through a sync regeneration network including a sync height limiter circuit 51 for limiting the negative excursion of synchronizing waveform, a circuit 52 for removing sync from the video, an amplifier rise time generator 53 in series with circuit 52 for developing new leading edge for the synchronizing waveform, and a circuit 54 for adding the regenerated sync waveform to the sync height limited video signal received from circuit 51.

After sync regeneration, the video is fed through the first stage of time-base correction provided by fixed delay lines 11. Following this corrective operation and after passage through the stretch sync inhibit circuit 32, video is passed through a second stage of tapped delay lines 56 which, in this instance, is essentially equivalent to the delay lines 11 and associated switching circuitry described above.

In the present embodiment, the first stage of tapped delay lines 11 provides a very coarse time-base error correction in that the values of fixed delay lines 11 are larger than each of the delay lines included in the second stage 56. By using a first set of relatively larger value delay lines followed by a second stage of relatively small value fixed lines, an efficient cost per delay unit of correction range is achieved.

Following the second stage of correction, hard clamp 47, as indicated above, functions to clamp or d.c. restore each horizontal line period to a desired d.c. level. As used herein, "hard clamp" refers to the ability of the clamping circuit to correct or restore each video period, in this instance a horizontal line, to a desired d.c. level. This fast response clamping is performed during the video sync tip of each horizontal line. It is this combination of a soft clamp at the input to the switched video followed by a hard clamp at the output which is believed to contribute substantially to the successful operation of this invention.

Another significant aspect of the present invention is the particular construction and operation of hard clamp circuit 47. Conventional hard clamp circuits have been found disadvantageous in the past due to their use of reactive capacitive components directly in the video signal path which introduce tilt in the video and fast-acting switching in shunt with the video signal path which introduce undesirable spike effects in the video signal disrupting the information carried thereby. In contrast, the hard clamp of the present invention, as illustrated in greater detail in FIGS. 3 and 4, has the characteristic advantage of isolating the clamping circuitry from the video signal path. With reference to FIGS. 3 and 4, the video path 61 extending from the output of the second stage of tapped delay lines 56 to the input of the last stage of correction as shown in FIG. 2 is provided with a clamping point or junction 62 connected to the clamping circuitry 63. As will be demonstrated in greater detail, the video signal path 61 does not pass through any reactive components nor are there any switching elements immediately in communication with junction 62. A further characteristic feature of this particular clamping circuit is its extremely fast response, functioning quickly enough to clamp each video line during the synchronizing tip of the horizontal blanking interval.

The circuit of FIGS. 3 and 4 operate in the following manner. A comparator 64 responds at one input to the video line voltage at junction 62 and at the other input to a clamp reference voltage. The output of comparator 64 assumes one or the other of two discrete values, lying at either a high or low logic state, depending on whether the video at junction 62 during the measurement mode is above or below the clamp reference. A control logic circuit 65, enabled by a sync input signal which is derived from video sync by means of a sync stripper 50, causes circuit 65 to respond to the output of comparator 64 and to activate either a positive constant current source 66 or a negative constant current source 67, depending on the logic state at the output of the comparator. A holding capacitor 68, together with a buffer or operational amplifier 69, functions to develop an increasing or decreasing voltage at junction 62 proportional to the charge on storage capacitor 68 thereby adding or subtracting an appropriate d.c. offset to the video signal level. A resister 71 serves to isolate the low impedance output of buffer 69 from junction 62. The input to comparator 64 is of high impedance and thus, junction 62 is isolated at both ends of circuit 64 from the internal switching operations thereof.

As an example of the sequence of operations, if the video sync tip at clamping junction 62 is below clamp reference, comparator 64 and control logic 65 operate to activate positive current source 66 which in turn pumps a steady stream of current into capacitor 68 rapidly increasing the voltage at junction 62. As the voltage at clamping junction 62 crosses the clamp reference level the logic condition of the comparator output changes state causing the control logic circuit 65 to disable or turn off positive current source 66 leaving junction 62 at the correct d.c. voltage. In general, the operation of the circuit in response to a video sync tip at junction 62 lying above clamp reference is similar, with the following exception. Control logic 65 functions to turn off both current sources only in response to the voltage at junction 62 crossing the clamp reference level in a particular direction. The purpose and operation of this unidirectional response of control logic 64 will be discussed in further detail in connection with the schematic diagram of FIG. 4. The entire searching sequence for the correct d.c. voltage occurs within the time width of the horizontal sync tip. Once the correct offset is reached, it is held or stored on capacitor 68 for the duration of the succeeding video line.

It is observed that the construction and operation of hard clamp 47 of FIG. 3 is based on a digital or discrete level logic in which the correction of the offset error is performed at discrete current and voltage levels except for the variable charge on capacitor 68. This principle of operation is believed to provide for the exceedingly reliable and fast-acting functioning of the circuit. Furthermore, the use of logic control as opposed to analog control significantly reduces the manufacturing cost of the network.

With reference to FIG. 4, comparator 64 is, in this instance, formed by a TTL (transistor-transistor logic) logic device having an output 76 which is coupled to control logic 65 through an input converter stage 77 in this instance comprising a MECL (motorola emitter coupled logic) converter serving to transform the TTL logic on line 76 to MECL logic upon which the control logic 65 is based. The output of the MECL converter 77 issues separate signals of complimentary states over lines 78 and 79 which are coupled as shown to a pair of AND gates 81 and 82 operating the positive and negative current sources 66 and 67. Another AND gate 83 has an input connected directly to output line 78 and a second input connected through a RC (resistive-capacitive) delay network to output line 79 which serves to disable AND gates 81 and 82 through an RS flip-flop 84 thus turning off the current sources in response to a particular transition of logic states of the output of comparator 64. In particular, and as indicated briefly above, control logic 65 operates to turn off the current sources only as the d. c. voltage of clamping junction 62 crosses the desired or clamp reference voltage from below to above (low to high). This functioning has the important advantage of always disposing the final voltage correction at junction 62 slightly above the reference level, rather than above or below depending on the polarity of the added d.c. correction and thus insuring a greater line-to-line accuracy in the clamping level.

Thus, assuming that the sync tip at junction 62 lies above reference, as sync input is received by control logic 64 and converted to MECL logic by a converter 86, an output from AND gate 87 sets flip-flop 84 which in turn enables the pair of AND gates 81 and 82 from the Q output of the flip-flop. Depending upon the logic condition of conparator 64 and the output lines 78 and 79 will enable one of AND gates 81 and 82 to turn on the appropriate one of current sources 66 and 67. Assuming that the video signal is initially above the clamp reference, comparator 64 and control logic 65 function to turn on current source 67 driving the voltage at clamping junction 62 downward. The video voltage at junction 62 during sync tip thus crosses the reference voltage in a high to low direction causing comparator 64 to change state which in turn switches the logic condition of the complimentary output lines 78 and 79. After this switching AND gate 82 turns off negative current source 67 and AND gate 81 turns on positive current source 66. The voltage on holding comparator 68 responds by raising the voltage level at junction 62 until clamp reference is again crossed, although in this instance from a low to high direction. Output lines 78 and 79 again switch logic states and RC delay network 89 at one of the inputs to AND gate 83 sustains the former voltage condition at such input and gate 83 thereupon responds to the changed voltage state at the other input issuing an output signal resetting flip-flop 84. Flip-flop 84 is thus restored to its original condition in which AND gates 81 and 82 are disabled by the Q output of the flip-flop device. The foregoing sequence of operations takes place entirely within the sync tip of a horizontal blanking waveform. The illustrated RC network connected between converter 86 and AND gate 87 provides a selective response so that only the leading edge of video sync sets flip-flop 84.

Following the d.c. restoration by hard clamp 47, a vernier corrector 91 as shown in FIG. 2 provides a final time-base error compensation. Preferably corrector 91 is a voltage variable delay line or lines responsive to horizontal reference and in color systems to the color subcarrier reference. Such a time-base error corrector is disclosed in U.S. Pat. No. 3,213,192. The final stage, circuit 92, provides for processing the video signal, eg. regenerating or adding new sync signals, and is of a construction well known to those skilled in the art.

What is claimed is:

1. In a time-base error correction system having a plurality of serially connected delay lines disposed to receive a video signal therethrough, a detection means comparing a reference synchronizing signal with the video signal as it appears at each of a plurality of taps, and switching means connecting a selected one of said taps to an output in response to the detection of the first occurring video synchronizing signal at one of said terminal ends following the reference synchronizing signal, the combination with said delay lines, detection means and switching means comprising;

an input clamping circuit connected at the input to said delay lines and being responsive to the average d.c. level of a plurality of video synchronizing signals to restore such d.c. level to a selected reference voltage, and an output d.c. clamping circuit connected at said output and being responsive to each synchronizing waveform of said video signal to clamp said output to a preselected reference voltage for the duration of the video signal period following each said synchronizing waveform.

2. The combination of claim 1 wherein said output clamping circuit comprises;

a comparator having one input connected to the video signal line to be clamped and another input adapted to receive a reference clamping voltage, capacitive storage means for holding the amount of d.c. voltage correction required during the period of said video signal following each synchronizing waveform, buffer means connecting said storage means to said line, current source means connected to and for passing current to said storage means to change the amount of d.c. voltage correction held thereby, and control logic circuit means connecting an output of said comparator to said current source means and being responsive to the synchronizing waveform of the video signal for responding to the output of said comparator means to operate said current source means in accordance therewith.

3. The combination of claim 2 wherein said comparator output assumes one of two logic states depending upon the relative levels of the voltage inputs thereto, said current source means includes a positive constant current source and a negative constant current source, and said control logic circuit means operates in response to the output logic state of said comparator to turn on one or the other of said current sources.

4. The combination of claim 3 wherein said control logic includes circuitry for sensing a transition in logic state at the output of said comparator and gate means responsive to such circuitry turning off both said current sources in response to such transition of states.

5. The combination of claim 4 wherein said control logic means further comprises circuitry operating said gate means to turn off both said current sources only in response to the transition of output states of said comparator in a predetermined direction.

* * * * *